United States Patent [19]

Bolthouse

[11] Patent Number: 4,807,859

[45] Date of Patent: Feb. 28, 1989

[54] DIE SPRING RETAINER

[76] Inventor: Robert Bolthouse, 7277 West Bay Shore Dr., Traverse City, Mich. 49684

[21] Appl. No.: 185,402

[22] Filed: Apr. 25, 1988

[51] Int. Cl.$^4$ .......................... F16F 7/00; F16F 1/12; B25G 3/28
[52] U.S. Cl. .................................... 267/170; 267/179; 403/281
[58] Field of Search ............... 267/130, 170, 174, 179, 267/166, 166.1, 167; 403/281, 282, 276; 411/147, 154

[56] References Cited

U.S. PATENT DOCUMENTS

| | | | |
|---|---|---|---|
| 1,724,394 | 8/1929 | Chamberlain | 403/281 |
| 2,456,302 | 12/1948 | Mocnik | 267/179 X |
| 3,042,959 | 7/1962 | Strom | 267/170 X |
| 3,169,757 | 2/1965 | Roder et al. | 267/170 X |
| 4,521,005 | 6/1985 | Calderoni | 267/179 |

Primary Examiner—Andres Kashnikow
Assistant Examiner—Robert J. Oberleitner
Attorney, Agent, or Firm—Douglas S. Bishop

[57] ABSTRACT

A die spring retainer for vertically affixing a die spring to a die set is configured as a generally circular blank defining a central opening adapted to receive a pilot screw therein. The blank includes a major portion having a first diameter and a minor portion having a second diameter less than the first diameter. The minor portion constitutes approximately 30 degrees to 120 degrees of the external circumference of the blank. The blank is fabricated from a deformable material and deforms under compression to the configuration of the first coil of the spring, thus securely affixing the die spring to a die set.

8 Claims, 1 Drawing Sheet

DIE SPRING RETAINER

FIELD OF THE INVENTION

This invention relates generally to spring retainers and more particularly to die spring retainers for vertically affixing a die spring to a die set.

BACKGROUND OF THE INVENTION

Metal forming presses generally include die sets or platens which have helical compression die springs associated therewith. The die springs are used to guide and align the die sets during repeated pressing operations and to facilitate easy die opening after the press forming. In most die forming apparatus, means are provided for vertically affixing the die springs to the die sets, generally in die spring pockets.

Frequently, the die springs break or lose compressive strength after repeated pressing operations and it becomes necessary to replace them. Obviously, it is desirable to accomplish such replacement as quickly and simply as possible. Typically, die springs are secured in cylindrical die spring pockets in the die sets by means of some kind of retainer. U.S. Pat. No. 4,521,005 discloses one such type of retainer having a generally circular base which includes a plurality of axially extending tangs circumferentially disposed around the periphery of the base. Each tang includes a retaining wall and gripping barb which engage the first coil of the spring, firmly securing it to the circular base. The spring and attached mount are then inserted into the die spring pocket where the barbs engage the cylindrical pocket walls. However, these retainers are difficult to fabricate quickly and precisely and require that the tangs be specifically aligned to engage both the die spring and the die spring pocket wall. The tangs are easily misaligned during production, resulting in an uneconomical waste of time and energy in physically straightening the tangs.

Yet another type of die spring retainer is known in the trade as a Danly Spring Retainer and consists of a housing into which the die spring is secured. The spring and housing combination must then be secured into an appropriately configured cylindrical die spring pocket. Danly Spring Retainers are spring-size specific, and their use requires mathematical computations based on factors such as the spring pressure at initial compression, die travel, and die spring diameter to select an appropriate size spring.

The foregoing die spring retainers represent some of the prior art approaches to the problem of vertically affixing die springs to die sets. Despite the various designs of spring retainer, such prior art retainers are less than satisfactory owing to their fabrication complexity and to the required inserts for precise springs selection computations attendant upon their use.

It will then be appreciated that there is yet a need for die spring retainers of relatively simply design which may be employed to vertically affix die springs of various sizes to die sets. It is further desired that such retainers be secured to die sets by utilizing pre-existing pilot screws found in the die sets, and that they be easily and inexpensively fabricated. The present invention addresses the inadequacies of the prior art by providing a simple, inexpensive die spring retainer which may be secured to a die set by means of a pre-existing pilot screw. These and other advantages of the present invention will be readily apparent from the drawings, discussions and claims which follow.

BRIEF DESCRIPTION OF THE INVENTION

The present invention provides a die spring retainer for vertically affixing a die spring to a die set. The retainer comprises a generally circular blank which defines a centrally located hole adapted to receive a pre-existing or standard size pilot screw. The blank has a major portion having a first diameter greater than or equal to the external diameter of the spring, and a minor portion having a second diameter less than or equal to the internal diameter of the spring. The minor portion constitutes approximately 30 degrees to 120 degrees of the external circumference of the blank while the major portion constitutes the remaining 240 degrees to 330 degrees. The blank is fabricated from a deformable material and deforms under the compressive force of the pilot screw so that the retainer engages an end face, or first coil, of the spring.

DETAILED DESCRIPTION OF THE PREFERRED EMBODIMENT

Figure 1:
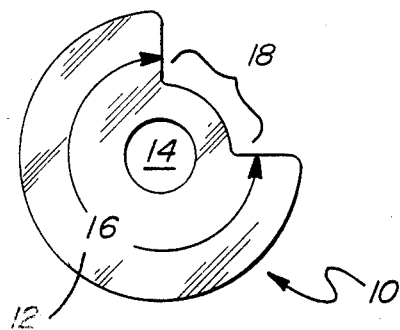
FIG. 1 is a top plan view of one particular embodiment of die spring retainer structured in accord with the principles of the present invention.

Referring to the drawings, FIG. 1 shows a top plan view of a die spring retainer 10 comprising a generally circular blank 12 defining a central opening 14 configured to receive and retain a standard pilot screw therein. The blank 12 includes a major portion 16 having a first, relatively large radius and constituting approximately 240 degrees to 330 degrees of the external circumference of the blank. The retainer further includes a minor portion 18 having a second diameter less than the first diameter. This minor portion 18, comprises approximately 30 degrees to 120 degrees of the external circumference of the retainer. As illustrated in the embodiment of FIG. 1, the minor portion 18 constitutes approximately 90 degrees of the external circumference of the blank, although it should be kept in mind that the minor portion 18, may be made larger or smaller in keeping with the spirit of the present invention.

The central opening 14 is adapted to receive a standard or pre-existing pilot screw found on a die set to secure the retainer 10 to the die set. It can therefore be seen that no special tools are needed to secure the retainer 10 to a die set nor is any modification of the die set required to accommodate the retainer 10.

Figure 2:
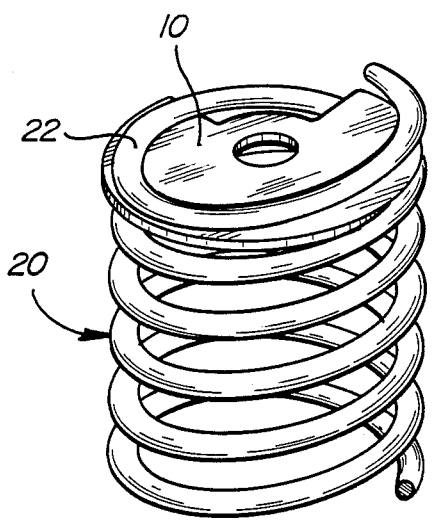
FIG. 2 is a perspective view of the die spring retainer of FIG. 1, as positioned in a die spring.
Figure 3:
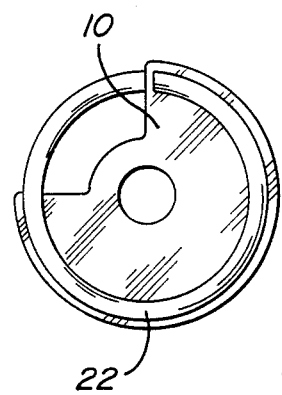
FIG. 3 is a top plan view of the spring and retainer of FIG. 2.

FIG. 2 illustrates a perspective view of the die spring retainer 10 positioned in a die spring 20, illustrating the manner in which the retainer 10, is employed. As shown, the retainer 10 is positioned under the end face or first coil 22 of the die spring 20. Reference to FIG. 3, which shows a top view of the spring 20 of FIG. 2 with the retainer 10 under the first coil 22 thereof illustrates the placement. As can be seen, the diameter of the major portion of the retainer 10 is greater than or equal to the external diameter of the die spring, allowing the retainer to engage the first coil of the spring. The diameter of the minor portion is less than or equal to the internal diameter of the die spring to allow for positioning of the retainer under only the first coil 22 of the spring. By including the cut out region defining the minor portion 18, the retainer 10 is adapted to fit within the coil of a spring, while accommodating the helical shape thereof, and allowing a second coil of the spring to pass beneath the retainer 10. This configuration is necessary to vertically affix the die spring by means of the retainer 10 to a die set.

In use, the retainer is positioned in a spring, and a pilot screw is inserted through the central opening. Tightening of the screw compresses the retainer and deforms it into conformity with the upper coil of the spring, as will be more fully described hereinbelow. Accordingly, the retainer may be advantageously fabricated from a variety of deformable materials such as metals and some types of high strength polymeric materials. Obviously, iron, alloy steels, copper, zinc, brass or combinations thereof may be economically used, but plastics may also be used.

Figure 4:
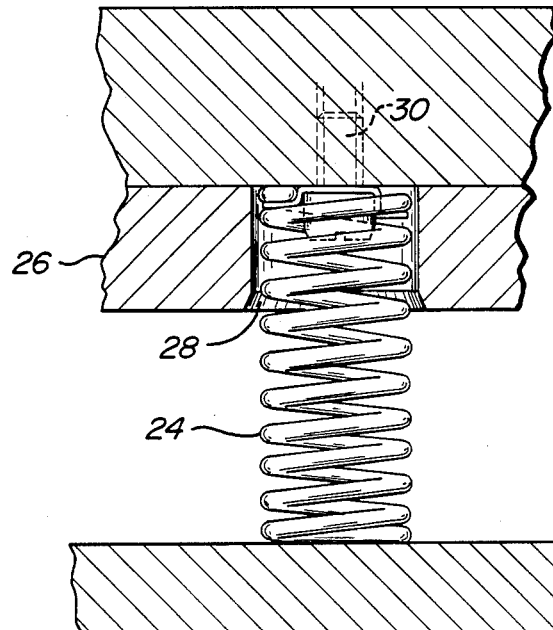
FIG. 4 is a cross-sectional view of a die set having a die spring vertically affixed thereto by the retainer of the present invention.

FIG. 4 illustrates the present invention vertically affixing a die spring 24 in a cylindrical die spring pocket 28, of a die set 26, utilizing a pre-existing pilot screw 30 (shown in phantom outline). In use, the retainer 10 is positioned under the end face or first coil of the die spring 24 and the combination is placed into the die spring pocket 28. The pilot screw 30 is placed through the centrally defined hole and threaded in to its pre-existing hole in the die set 26 utilizing tools common to those familiar with the art.

Upon tightening of the pilot screw 30, the retainer 10 plastically deforms due to the compressive forces acting upon it, and engages the first coil of the die spring 24. The major portion of the retainer plastically deforms over the first coil of the die spring 24, thus securely affixing the spring to the die set 26. As will be noted from the figure, the retainer is deformed to correspond to the contour of the coil and as such, retains the spring 24 in a vertical alignment. Since the retainer deforms to accommodate the shape of the spring, it may be utilized with a variety of different springs. Although the above description has been directed to plastically deforming the die spring retainer, it is obvious that the retainer need only to elastically deform to firmly secure the die spring to the die set.

To replace a broken or worn die spring, the pilot screw 30 is removed, a new retainer is positioned into a new die spring, and the procedure as described above is repeated. It is fast and economical, and it is unnecessary to completely disassemble the dies to replace the die springs.

In light of the foregoing, it should be apparent that many variations are possible within the scope of the present invention. Accordingly, the foregoing drawings, discussion and description are merely meant to be illustrative of particular embodiments of the invention and are not limitations upon the practice thereof. It is the following claims, including all equivalents, which define the scope of the invention.

What is claimed is:

1. A retainer for vertically affixing a die spring to a die set, said retainer comprising:
a generally circular blank fabricated from a deformable material and defining a central opening adapted to receive a pilot screw therein, said blank including a major portion having a first diameter and a minor portion having a second diameter less than said first diameter, the minor portion constituting approximately 30 degrees to 120 degrees of the external circumference of the blank, whereby said blank is adapted to deform under compression provided by tightening of said pilot screw received in the central opening thereof so as to conform to and engage an end face of the die spring.

2. A retainer as defined in claim 1, wherein said deformable material is made from at least one of iron, steel, copper, zinc, brass.

3. A retainer as defined in claim 1, wherein said minor portion constitutes approximately 90 degrees of the external circumference of the circular blank.

4. A retainer as defined in claim 1, wherein said major portion has a diameter at least equal to the external diameter of the spring.

5. A retainer as defined in claim 1, wherein said minor portion has a diameter less than or equal to the internal diameter of the spring.

6. A retainer as defined in claim 1, wherein the central opening of said blank is dimensioned so that the retainer can affix the die spring to the die set using a pre-existing die set pilot screw.

7. A retainer as defined in claim 1, wherein said deformable material is capable of plastically deforming under compression so as to conform to the configuration of the end face of the die spring.

8. A retainer as defined in claim 1, wherein said deformable material is capable of elastically deforming under compression so as to conform to the configuration of the end face of the die spring.

* * * * *